United States Patent
Yanagawase

(10) Patent No.: US 8,259,316 B2
(45) Date of Patent: Sep. 4, 2012

(54) IMAGE READING APPARATUS AND IMAGE FORMING APPARATUS HAVING A LIGHT ADJUSTING MEMBER

(75) Inventor: Hidenori Yanagawase, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1027 days.

(21) Appl. No.: 12/209,255

(22) Filed: Sep. 12, 2008

(65) Prior Publication Data

US 2009/0073480 A1  Mar. 19, 2009

(30) Foreign Application Priority Data

Sep. 14, 2007  (JP) ................................. 2007-239119

(51) Int. Cl.
*G06F 3/12*  (2006.01)
(52) U.S. Cl. ...... 358/1.13; 358/1.12; 358/474; 358/475; 358/488
(58) Field of Classification Search .................. 358/475, 358/487, 1.1, 1.12, 1.13, 400, 401, 474, 488, 358/498
See application file for complete search history.

(56) References Cited

U.S. PATENT DOCUMENTS

| | | | | |
|---|---|---|---|---|
| 5,790,211 | A | * | 8/1998 | Seachman et al. ................. 349/3 |
| 6,219,158 | B1 | * | 4/2001 | Dawe ............................ 358/509 |
| 6,977,759 | B2 | | 12/2005 | Kumagai et al. |
| 2001/0035984 | A1 | | 11/2001 | Kumagai et al. |

FOREIGN PATENT DOCUMENTS

| | | |
|---|---|---|
| JP | 63043469 A | 2/1988 |
| JP | 03110541 A | 5/1991 |
| JP | 07099561 A | 4/1995 |
| JP | 09127620 A | 5/1997 |
| JP | 10206979 A | 8/1998 |
| JP | 2001-169080 A | 6/2001 |
| JP | 2001218018 A | 8/2001 |
| JP | 2001313787 A | 11/2001 |
| JP | 2002290738 A | 10/2002 |

OTHER PUBLICATIONS

Notification of Reasons for Refusal issued on Sep. 30, 2009 from the Japanese Patent Office concerning counterpart Application No. 2007-239119.

* cited by examiner

*Primary Examiner* — Thomas D Lee
(74) *Attorney, Agent, or Firm* — Panitch Schwarze Belisario & Nadel LLP

(57) ABSTRACT

An image reading apparatus includes a reading unit, a first guide member, a second guide member, a light adjusting member and a light adjusting control unit. The reading unit reads an original document. The first guide member places the original document thereon when the reading unit reads the original document. The second guide member is disposed opposite to the first guide member. The light adjusting member is disposed between the first guide member and the second guide member and adjusts permeation of light irradiated from the reading unit. The light adjusting control unit controls in such a manner to adjust the light permeating through the light adjusting member when the reading unit reads the original document.

8 Claims, 9 Drawing Sheets

IMAGE READING APPARATUS AND IMAGE FORMING APPARATUS HAVING A LIGHT ADJUSTING MEMBER

BACKGROUND OF THE INVENTION

1. Field of the Invention

The present invention relates to an image reading apparatus capable of adjusting reflection light irradiated from a backside of an original document, and also relates to an image forming apparatus including an image reading apparatus.

2. Description of Related Art

A related art image reading apparatus such as a scanner, a photocopier, a facsimile or a multifunctional device (capable of serving at least two of the following functions, scanner, photocopier and facsimile) includes an image reading unit having a light source irradiating an original document to be read placed on an original document setting tray with light and a photoelectric conversion element photoelectrically converting the light reflected from the original document. Such a related art image reading apparatus uses the image reading unit to scan, while moving along, the original document, thereby reading the image of the original document (see, e.g., Japanese Un-examined Patent Application Publication No. 2001-169080). The related art image reading apparatus also includes a pressure plate pressing the original document placed on the original document setting tray. The pressure plate is white so as to serve as a back ground of an original document when the original document is placed on the original document setting tray and to detect whether or not the original document is placed the original document setting tray.

However, in such a related art image reading apparatus, when an image on a front side of an original document having images printed both sides is read, the light from the light source permeates through the original document, and an image on a backside of the original document becomes visible due to the light reflected from the white pressure plate. In this regard, the image on the backside of the original document is incorporated in the light reflected from the front side of the original document, that is, a phenomenon so called "show-through" is generated, and an image quality is significantly deteriorated. Moreover, in a related art image reading apparatus capable of reading the image on the front side of the original document by automatically feeding the original document, when the original document placed on the original document setting tray is read, there raises a problem that the image quality is deteriorated by, for example, a phenomenon of darkening an area of the image, etc. due to a different refection rate of a portion of the original document pressure plate pressing the original document. Consequently, the related art image reading apparatus generates such phenomena due to the reflection light irradiating the original document from the backside by reflecting the light permeated through the original document in a course of reading the original document.

BRIEF SUMMARY OF THE INVENTION

According to an aspect of the invention, an image reading apparatus includes: a reading unit reading an original document; a first guide member placing the original document thereon when the reading unit reads the original document; a second guide member disposed opposite to the first guide member; a light adjusting member disposed between the first guide member and the second guide member and adjusting permeation of light irradiated from the reading unit; and a light adjusting control unit controlling in such a manner to adjust the light permeating through the light adjusting member when the reading unit reads the original document.

According to anther aspect of the invention, an image forming apparatus includes an image reading apparatus described above and an image forming mechanism forming an image corresponding to image data generated by the image reading apparatus.

Additional features and advantages of the present invention will be more fully apparent from the following detailed description of embodiments, the accompanying drawings and the associated claims.

BRIEF DESCRIPTION OF THE DRAWINGS

A more complete appreciation of the aspects of the invention and many of the attendant advantage thereof will be readily obtained as the same becomes better understood by reference to the following detailed description when considered in connection with the accompanying drawings, wherein.

DETAILED DESCRIPTION OF PREFERRED EMBODIMENTS

Figure 1:
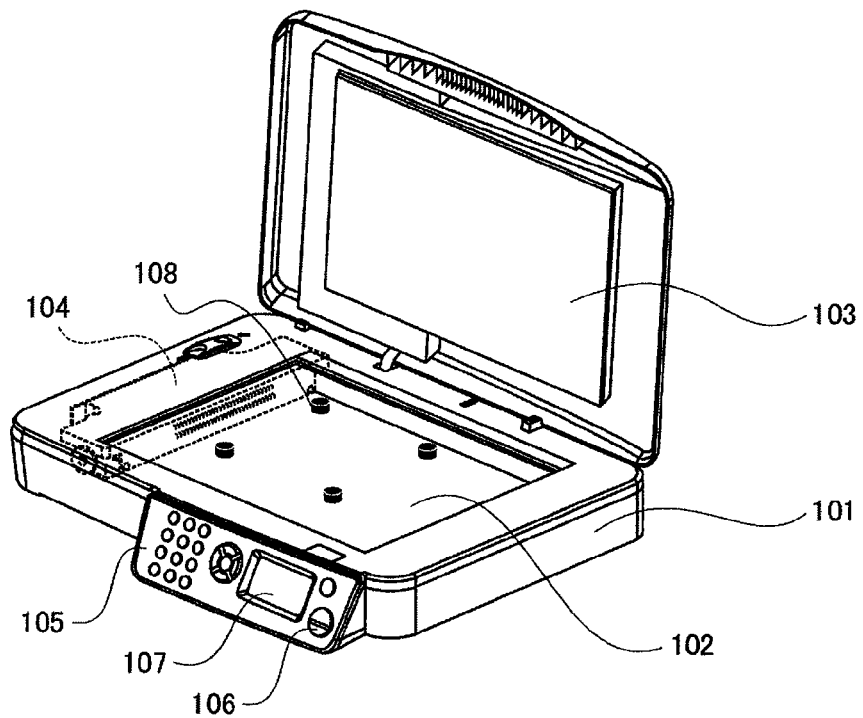
FIG. 1 is a perspective view illustrating an image reading apparatus according to a first embodiment of the present invention.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Preferred embodiments of the present invention are now described in detail referring to the drawings, wherein like reference numerals designate identical or corresponding parts throughout the several views.

First Embodiment

Figure 2:
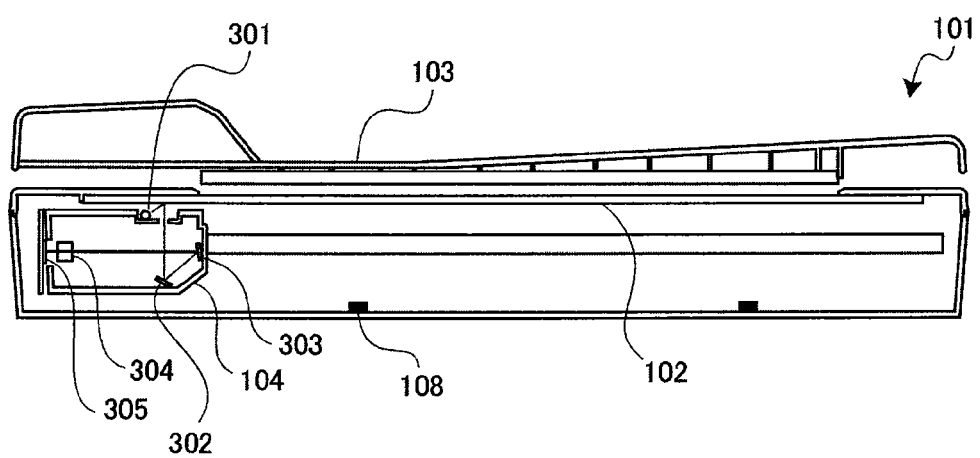
FIG. 2 is a longitudinal direction cross-sectional view illustrating the image reading apparatus according to the first embodiment of the present invention.

Referring to FIGS. 1 and 2, the image reading apparatus 101 according to the first embodiment of the present invention is illustrated in a perspective view and a longitudinal direction cross-sectional view, respectively. As illustrated in FIG. 1, the image reading apparatus 101 includes an original document (O.D.) setting tray 102 serving as a first guide member, an original document (O.D.) pressure plate 103 serving as a second guide member, an image reading unit 104, an operation panel 105, a key-switch group 106, a liquid crystal panel 107 and an original document (O.D.) detection sensor 108.

The original document setting tray 102 serves as the first guide member on which an image to be read by the image reading unit 104 is placed. According to the first embodiment, the original document setting tray 102 includes a permeation member made of glass, etc. capable of permeating therethrough the light irradiated from a cold-cathode tube 310 (described later) of the image reading unit 104.

The original document pressure plate 103 is disposed opposite to the original document setting tray 102 and serves as the second guide member capable of opening and closing thereof with respect to the original document setting tray 102. The original document pressure plate 103 presses the original document placed on the original document setting tray 102 to the original document setting tray 102.

As illustrated in FIG. 2, the image reading unit 104 is movable inside the image reading apparatus 101 with a motor 413 (described later) and a belt mechanism (not shown), thereby scanning and reading the original document placed on the original document setting tray 102 from a bottom. The image reading unit 104 includes the cold-cathode tube 301 serving as a light source, mirror surfaces 302 and 303, a lens 304, a charge coupled device (CCD) image sensor 305 and a cold-cathode tube lighting circuit 410 (described later) lighting the cold-cathode tube 310.

In the image reading unit 104, the colt-cathode tube 301 lights when the original document on the original document setting tray 102 is read, so that the light is reflected by the original document placed on the original document setting tray 102. The light reflected by the original document is reflected by the mirror surfaces 302 and 303 and is collected by the lens 304. The light collected by the lens 304 is received by the CCD image sensor 305 serving as a photoelectric conversion element. The image reading unit 104 extracts the image on the original document as voltage in response to a light amount received by the CCD image sensor 305 (i.e., a light amount of the refection light of the original document). The original document placed on the original document setting tray 102 is scanned from the bottom, so that the original document as a whole is converted into the voltage and is read.

Figure 3:
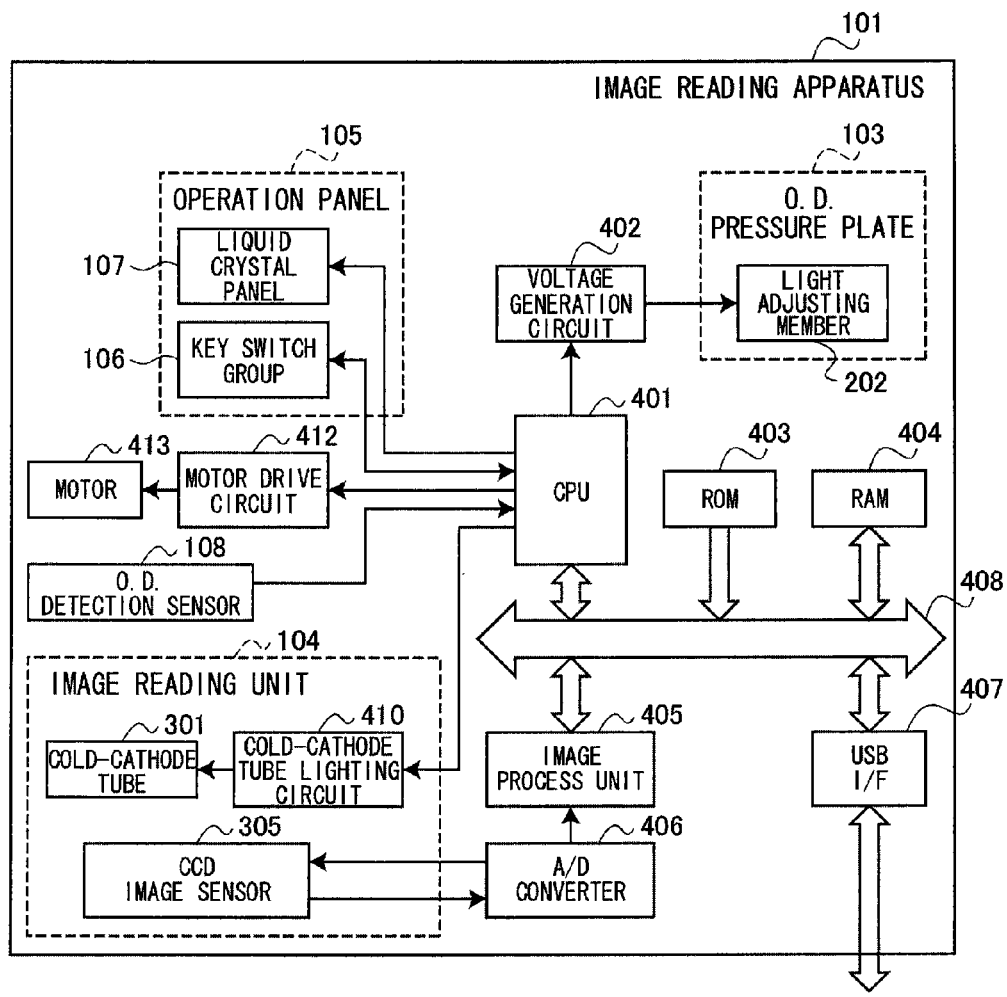
FIG. 3 is a block diagram illustrating hardware of the image reading apparatus according to the first embodiment of the present invention.

Referring to FIG. 3, hardware of the image reading apparatus 101 is illustrated in a block diagram. In addition to the original document pressure plate 103, the image reading unit 104 and the operation panel 105 described above, the image reading apparatus 101 includes a central processing unit (CPU) 401, a voltage generation circuit 402, a read only memory (ROM) 403, a random access memory (RAM) 404, an image process unit 405, an analogue digital (A/D) converter 406, a universal serial bus interface (USBI/F) 407, a data control bus 408, the cold-cathode tube lighting circuit 410, a motor drive circuit 412, and a motor 413.

The CPU 401 includes a microprocessor (not shown) and executes a program by reading out from the ROM 403. Here, the CPU 401 executes the program while using the RAM 404 so as to control operation of each unit.

The ROM 403 includes a nonvolatile memory (not shown) such as a flash memory, an ultra-violet erasable programmable read only memory (UV-EPROM) and an electronically erasable and programmable read only memory (EEPROM), and stores a control program.

The RAM 404 includes, for example, a dynamic RAM (DRAM) and a synchronous DRAM (SDRAM) and is a volatile memory used for program execution or data calculation.

The USBI/F 407 is an interface communicating with a computer serving as a host computer or a printer through the data control bus 408. The USBI/F 407 transmits image data of the original document read to the outside and receives control information from the outside to notify the CPU 401.

The voltage generation circuit 402 applies the voltage to a light adjusting member 202 (described later) included in the original document pressure plate 103. The voltage generation circuit 402 is controlled by the CPU 401 such that the light permeates through the light adjusting member 202 (i.e., in a light-transmissive state) by application of the voltage. When the voltage is not applied to the light adjusting member 202 from the voltage generation circuit 402, the light adjusting member 202 becomes in a state that the light is diffused, i.e., in a light diffusion state. The voltage generation circuit 402 is controlled by the CPU 401, and the CPU 401 serves as a light adjusting control unit controlling the light adjusting member 202.

The cold-cathode tube lighting circuit 410 lights the cold-cathode tube 301 of the image reading unit 104 described above. When the image reading unit 104 reads the original document, the cold-cathode tube lighting circuit 410 lights the cold-cathode tube 301 based on the control of CPU 401 and reads the image on the original document.

The A/D converter 406 converts an image voltage signal photoelectrically converted by the CCD image sensor 305 of the image reading unit 104 into a digital signal. Here, the image process unit 405 performs an image process such as a bit correction of a light receiving element or a gamma correction.

The motor 413 is driven by the motor drive circuit 412 with power moving the image reading unit 104 along the belt mechanism (not shown). When the image reading unit 104 reads the original document, the motor drive circuit 412 drives the motor 413 based on the control of the CPU 401 and moves the image reading unit 104 along the original document placed on the original document setting tray 102. Therefore, the original document as a whole is photoelectrically converted, and the image data is obtained.

The operation panel 105 includes the key switch group 106 and the liquid crystal panel 107 and operates the image reading apparatus 101. The key switch group 106 is connected to the CPU 401 and notifies a state of each of the switches. The CPU 401 controls each operation of the image reading apparatus 101, based on the state of each of the switches, such as an activation or arrangement of an image reading operation. The liquid crystal panel 107 is connected to the CPU 401 and displays a state, an arrangement or an operation state of the image reading apparatus 101 to a user according to an instruction of the CPU 401.

The original document detection sensor 108 is, for example, a reflective photo-interrupter having an infrared light source and the light receiving element. The original document detection sensor 108 irradiates in a direction of the original document setting tray 102 with the light from the light source, receives the reflection light by the light receiving element, detects whether or not the original document is placed (i.e., a presence or absence of the original document) on the original document setting tray 102 based on a difference of reflection light amounts, and notifies a detection result to the CPU 401. A plurality of the original document detection sensors 108 are disposed on a bottom surface of the image reading apparatus 101, and detect a size of the original document placed on the original document setting tray 102 by decision made by the CPU 401 based on a combination of position of each original document detection sensor 108 disposed and a state of the presence or the absence of the original document in each original document detection sensor 108.

Figure 4:
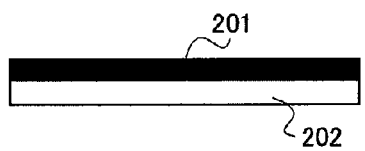
FIG. 4 is a schematic diagram illustrating an original document pressure plate of the image reading apparatus according to the first embodiment of the present invention.

Now, the original document pressure plate 103 is described in detail with reference to a cross-sectional view illustrated in FIG. 4. The original document pressure plate 103 includes the light adjusting member 202 disposed on a side of the original document setting tray 102 and a background member 201 disposed on an upper surface of an opposite side from the original document setting tray 102 with the light adjusting member 202 therebetween. The background member 201 and the light adjusting member 202 can be integrated. Alternatively, the background member 201 and the light adjusting member 202 may not be integrated as long as the light adjusting member 202 is disposed between the original document setting tray 102 and the background member 201. The background member 201 can be black across the entire thereof. Alternatively, at least a side opposite to the light adjusting member 202 of the background member 201 may be black.

Figure 5:
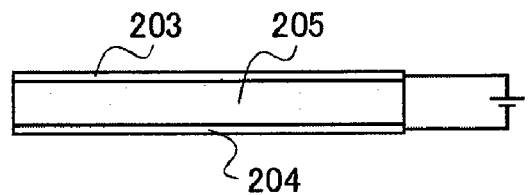
FIG. 5 is a schematic diagram illustrating a light adjusting member of the image reading apparatus according to the first embodiment of the present invention.

Referring to FIG. 5, the light adjusting member 202 is illustrated in detail. The light adjusting member 202 includes a liquid crystal polymer sheet 205 that is disposed between polyethylene sheets 203 and 204 each of which has a transparent electrode disposed thereto. A commonly known sheet can be used for each of the polyethylene sheets 202 and 203 having the transparent electrode and the liquid crystal polymer sheet 205. According to the present invention, the light adjusting member 202 is a form of sheet, but not limited thereto and can employ a glass material for a transparent electrode substrate.

The light adjusting member 202 can adjust permeation of the light therethrough by changing a state of the liquid crystal polymer sheet 205 disposed between the polyethylene sheets 203 and 204 depending upon whether or not the voltage is applied to the polyethylene sheets 203 and 204 serving as electrodes. In other words, the permeation of the light through the light adjusting member 202 or reflection of the light from the light adjusting member 202 can be selected depending upon whether or not the voltage is applied.

Figure 6:
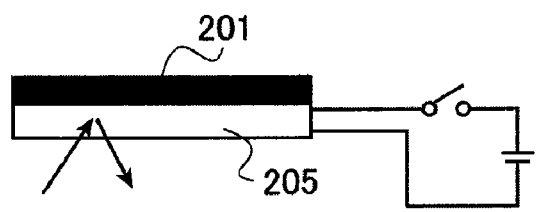
FIG. 6 is a schematic diagram illustrating the original document pressure plate in a scatteration state in the image reading apparatus according to the first embodiment of the present invention.

When the voltage is not applied to the polyethylene sheets 203 or 204 serving as the electrodes, the light adjusting member 202 is in the light diffusion state. Therefore, the light irradiated toward the light adjusting member 202 is diffused inside the liquid crystal polymer sheet 205 of the light adjusting member 202 and becomes in a state of a high reflection rate. In such a state, when the light is irradiated from the image reading unit 104 side, the light is scattered and reflected due to being in the light diffusion state of the light adjusting member 202 as illustrated in FIG. 6. Therefore, a surface of the original document pressure plate 103 at the original document setting tray 102 side is white although the background member 201 is black.

Figure 7:
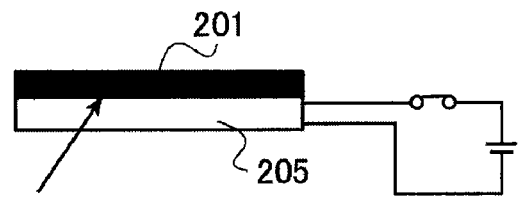
FIG. 7 is a schematic diagram illustrating the original document pressure plate in a non-scatteration state in the image reading apparatus according to the first embodiment of the present invention.

On the other hand, when the voltage is applied to the polyethylene sheets 203 and 204 serving as the electrodes, the light adjusting member 202 is in the light-transmissive state. Therefore, the irradiated light permeates through the light adjusting member 202. In such a state, when the light is irradiated from the image reading unit 104 side, the light permeates through the light adjusting member 202 due to being in the light-transmissive state of the light adjusting member 202 as illustrated in FIG. 7. Therefore, the light permeated through the light adjusting member 202 is absorbed by the background member 201, and a surface of the original document pressure plate 103 at the original document setting tray 102 side becomes black that is a color of the background member 201.

The light adjusting member 202 includes the polyethylene sheets 203 and 204 having the transparent electrodes, and the polyethylene sheets 203 and 204 are connected to the voltage generation circuit 402 described above. Therefore, the voltage generation circuit 402 is controlled based on the control of the CPU 401, so that a color of at least the surface of the original document pressure plate 103 at the original document setting tray 102 side is switched.

Now, a description will be given of an operation of the image reading apparatus 101 according to the first embodiment of the present invention described above.

Figure 8:
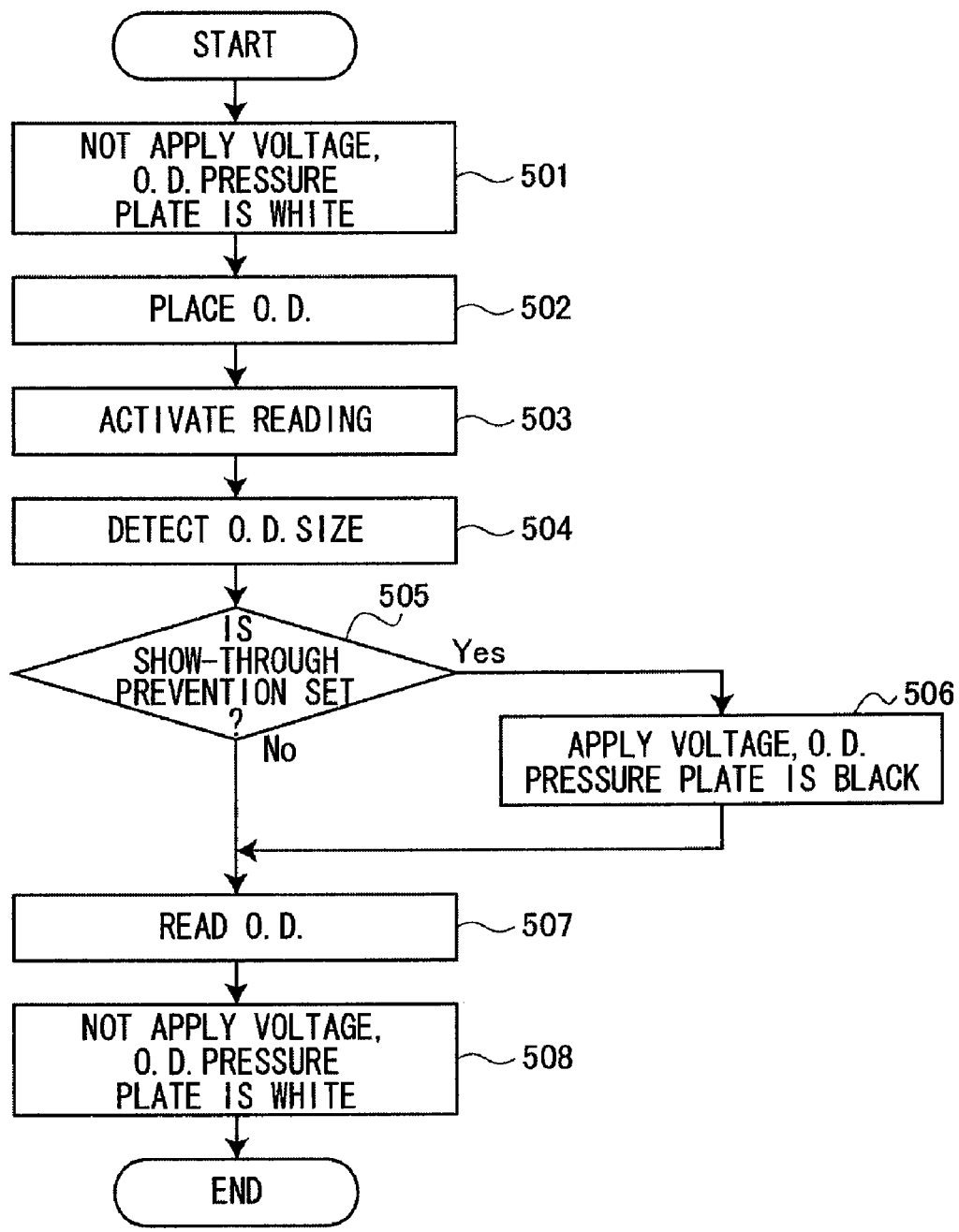
FIG. 8 is a flowchart illustrating an example procedure for a reading operation of the image reading apparatus according to the first embodiment of the present invention.

Referring to FIG. 8, a flowchart illustrates an example procedure for a reading operation in the image reading apparatus 101 according to the first embodiment. Prior to the reading operation of the original document in the image reading apparatus 101, the CPU 401 controls not to apply the voltage from the generation circuit 402 to the light adjusting member 202. Consequently, prior to the reading operation, the light adjusting member 202 becomes in the light diffusion state having the high reflection rate, and the original document pressure plate 103 becomes white as being in a scatteration state (step S501).

In such states, the user of the image reading apparatus 101 places the original document on the original document setting tray 102 such that a surface of the image of the original document to be read faces to the image reading unit 104 (step S502).

In a case where the user would like to reduce an occurrence of show-through of the original document having images printed on both sides, the user sets a show-through prevention using the key switch group 106 while confirming the liquid crystal panel 107 of the operation panel 105. Here, the user sets the show-through prevention according to the first embodiment; however, it should be noted that the first embodiment of the present invention is not limited thereto. Alternatively, a sensor or the image reading unit 104 may be employed to automatically detect the original document having a possibility of show-through, for example, the original document having the images printed on both sides so as to automatically set a function of the show-through prevention. After setting the show-through prevention, the user activates the reading operation to execute reading of the original document (step S503).

When the CPU 401 receives an instruction from the operation panel 105 to activate the reading operation of the original document, the CPU 401 obtains a state of each of the original document detection sensors 108 and detects the size of the original document before reading the original document (step S504). Here, the original document pressure plate 103 is white.

Each of the original document detection sensors 108 detects the reflection light from an object. In a case where the original document pressure plate 103 absorbs the light (e.g., the original document pressure plate 103 is black), the light is not reflected, and consequently, the original document detection sensors 108 cannot detect the original document. Therefore, when the original document detection sensors 108 detects the original document, the original document pressure plate 103 needs to be, for example, white that is a color capable of reflecting the light irradiated from the original document detection sensor 108.

After detecting the size of the original document, the CPU 401 determines whether or not the show-through prevention is set (step S505). Where the show-through prevention is set (Yes in Step S505), the CPU 401 controls to apply the voltage to the light adjusting member 202 through the voltage generation circuit 402 (step S506). Therefore, the light adjusting member 202 becomes in the light-transmissive state permeating the light, and the original document pressure plate 103 becomes black as being in a non-scatteration state.

Where the show-through prevention is not set (No in step S505), the CPU 401 controls not to apply the voltage to the light adjusting member 202 through the voltage generation circuit 402. Therefore, the original document pressure plate 103 remains white.

Subsequently, the CPU 401 controls to read the original document placed on the original document setting tray 102 (step S507). In such a reading operation, the CPU 401 controls the motor 413 to rotate through the motor drive circuit 412, and the image reading unit 104 to move to a start position of the original document reading in such a manner to be along the original document setting tray 102.

Next, the CPU 401 controls the cold-cathode tube 301 to light though the cold-cathode tube lighting circuit 410. Simultaneously, the CPU 401 controls the image process unit 405 to arrange a size of the original document to be read placed on the original document setting tray 102 and to begin the process. Here, the image process unit 405 activates the CCD image sensor 305 and the A/D converter 406.

When the cold-cathode tube 301 lights, the generated light irradiates the surface of the original document placed on the original document setting tray 102 and is reflected by the surface of the original document. After the reflection light from the surface of the original document is reflected by the mirror surfaces 302 and 303 disposed inside the image reading unit 104, the light is collected by the lens 304. Subsequently, the collected light is photoelectrically converted by the CCD image sensor 305.

The CCD image sensor 305 generates the voltage using the light amount received by the photoelectrical conversion. The A/D converter 406 receives the voltage generated by the CCD image sensor 305 and converts the received voltage into the digital value. In other words, the image of the original document read by the image reading unit 104 is converted into the digital value. The image process unit 405 cuts the image data converted into the digital value to a width of the original document detected beforehand by the original document detection sensor 108, and executes a predetermined image process such as the bit correction.

The CPU 401 again controls the motor 413 to rotate through the motor drive circuit 412 and controls the image reading unit 104 to move in such a manner to be along the original document setting tray 102. After the image reading unit 104 moves, as similar to above, the image of the original document is read and converted into the digital value, so that the image data converted into the digital value is transmitted to the image process unit 405. Thus, the CPU 401 controls the image reading unit 104 to move to a position in accordance with a length of the original document detected beforehand by the original document detection sensor 108. In other words, the original document placed on the original document setting tray 102 is sequentially scanned from a leading end to a tailing end thereof by the CCD image sensor 305, so that the image across entire the surface of the original document facing to the image reading unit 104 is read. The CPU 401 controls to transmit the image data read by the image reading unit 104 to the outside through the USBI/F 407.

In a course of such a reading operation, in a case where the show-through prevention is set, the original document pressure plate 103 is black as being in the non-scatteration state. In such a situation, the background member 201 absorbs a portion of the light permeated through the light adjusting member 202 among the light irradiated the original document from the cold-cathode tube 301. In other words, the light from the backside of the original document reduces (if not eliminates) an occurrence of being incorporated into the light reflected by the surface of the original document, thereby reducing (if not eliminating) an occurrence of show-through. Consequently, a good image can be obtained.

Upon finishing the reading operation of the original document, where the voltage is applied to the light adjusting member 202, the CPU 401 controls to halt the application of the voltage to the light adjusting member 202 through the voltage generation circuit 402, and controls the original document pressure plate 103 to become white as being in the scatteration state (step S508). After the original document pressure plate 103 becomes white, the CPU 401 finishes the reading operation.

Therefore, the image reading apparatus 101 according to the first embodiment of the present invention can provide a high quality image without any show-through even when the original document having the images printed on both sides is read. In other words, the permeation of the light through the light adjusting member 202 of the original document pressure plate 103 is adjusted, thereby reducing (if not eliminating) deterioration in the image quality caused by the reflection light irradiated from the backside of the original document in the course of reading the original document. Therefore, a higher quality image is obtained.

Moreover, the light permeating through the light adjusting member 202 is adjusted such that the light adjusting member 202 is switched to the light-transmissive state or the light diffusion state, thereby controlling the light adjusting member 202 in response to each process, for example, in the course of detecting the size of the original document or the reading operation of the original document. Therefore, the image reading apparatus 101 of the present invention can provide the higher quality image.

Without disturbing the operation of detecting the original document described above, the image reading apparatus 101 according to the first embodiment of the present invention can remove a show-through image without misrecognition where a sheet medium having a small thickness and a low level of whiteness such as a sheet of recycled paper has relatively small differences among a background density, a front side image density, and a show-through image density.

Where an original document having a small thickness is read, the original document pressure plate 103 absorbs the light permeated through the original document, resulting in darkness of the image as a whole to be read. However, such darkness of the image can be corrected by a base removing process of a known manner such as detection of a density histogram within the image process unit 405.

Moreover, where an original document having an image printed on one side, for example, is used (i.e., the show-through is not recognized), the light adjusting member 202 of the original document pressure plate 103 can remain in the light diffusion state without control. Consequently, the image as a whole is not darkened, and the high quality image is obtained. In other words, the light adjusting member 202 can be in the light-transmissive state as necessary, so that the higher quality image is obtained.

In the image reading apparatus 101 according to the first embodiment of the present invention, the original document pressure plate 103 pressing the original document toward the original document setting tray 102 is switched from white to black in color in the course of reading the original document, but not limited thereto, and it must be understood that the present invention encompasses all modifications possible as long as the reflection light irradiated from the backside of the original document is adjusted by switching the light adjusting member 202 to the light diffusion state and the light-transmissive state.

The example of detecting the original document using the reflective photo-interrupter is described above as a method for detecting the size of the original document. Alternatively, the size of the original document may be detected by, for example, detection of a shadow generated at an end of the original document from a density difference based on the image data obtained by scanning the original document setting tray 102 once using the image reading unit 104 prior to the image reading operation.

Second Embodiment

Figure 9:
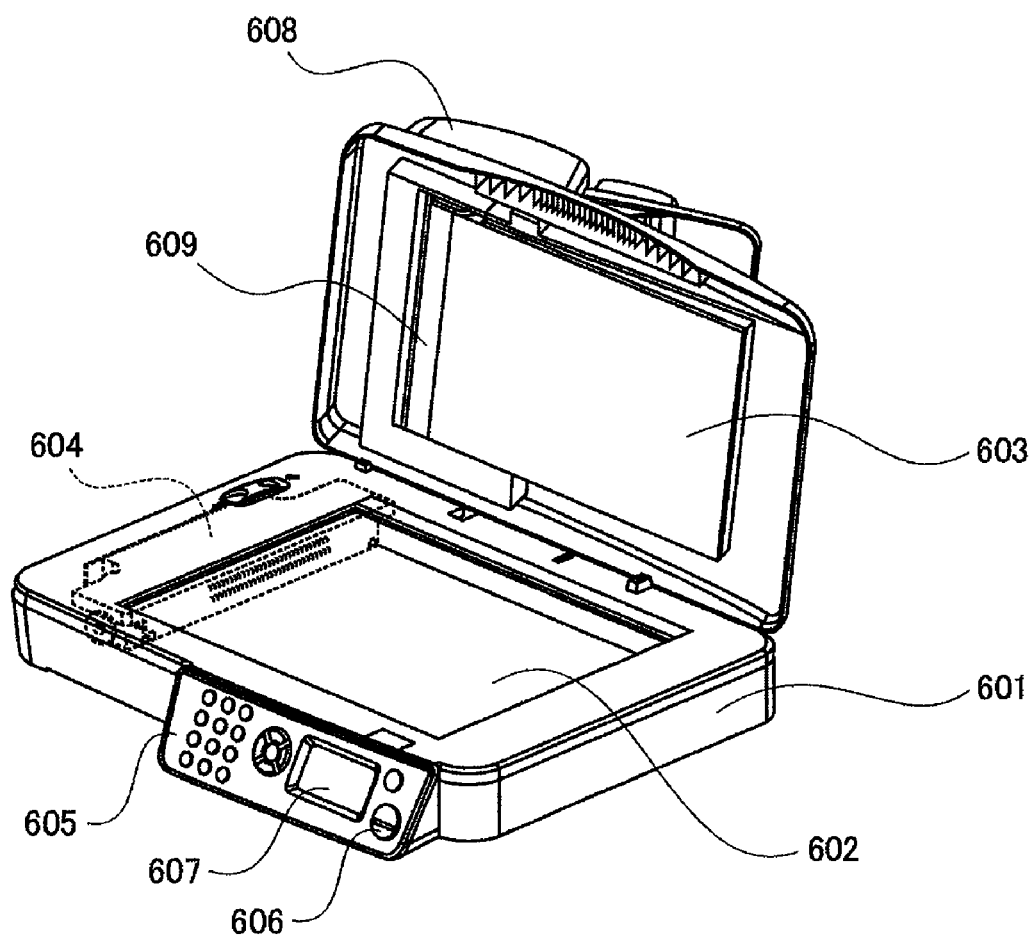
FIG. 9 is a perspective view illustrating an image reading apparatus according to a second embodiment of the present invention.
Figure 10:
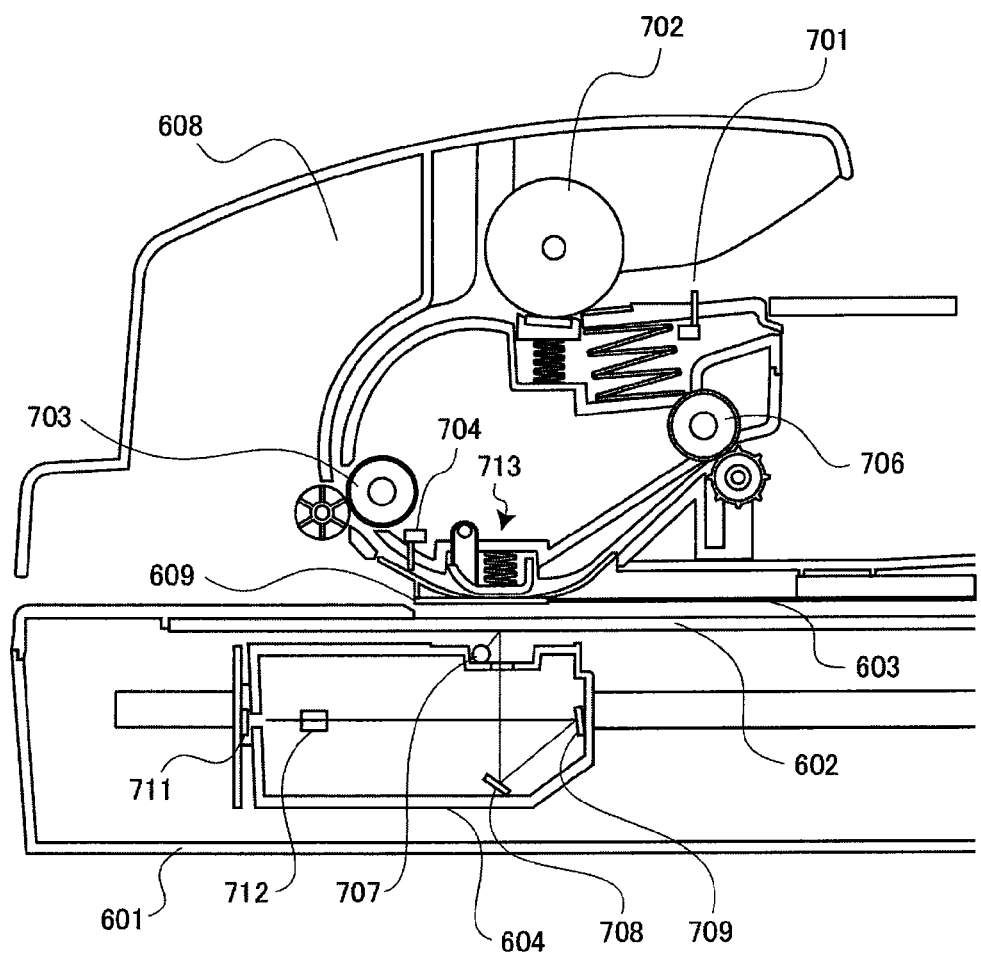
FIG. 10 is a longitudinal direction cross-sectional view partially illustrating the image reading apparatus according to the second embodiment of the present invention.

Referring to FIGS. 9 and 10, an image reading apparatus 601 according to a second embodiment of the present invention is illustrated in a perspective view and a longitudinal direction cross-sectional view, respectively. As illustrated in FIG. 9, the image reading apparatus 601 includes an original document setting tray 602 serving as a first guide member, an original document feeding unit 608 serving as a second guide member, an original document pressure plate 603, an image reading unit 604, an operation panel 605, a key switch group 606 and a liquid crystal panel 607. Since the original document setting tray 602 and the operation panel 605 having the key switch group 606 and the liquid crystal panel 607 are similar to the original document setting tray 102 and the operation panel 105 having the key switch group 106 and the liquid crystal panel 107 of the first embodiment described above, description thereof will be omitted.

The original document pressure plate 603 is disposed opposite to the original document setting tray 602, is capable of opening and closing thereof with respect to the original document setting tray 602, and is integrated with the original document feeding unit 608. Unlike the original document pressure plate 103 having the light adjusting member 202 of the first embodiment described above, the original document pressure plate 603 of the second embodiment employs, for example, a white sheet member. The original document pressure plate 603 presses a reading region as a whole on the original document setting tray 602 except for a reading window 609 (described later) when the original document pressure plate 603 is placed by closing thereof with respect to the original document setting tray 602.

The image reading unit 604 is movable with a motor 813 (described later) and a belt mechanism (not shown) and includes a cold-cathode tube 707 serving as a light source, mirror surfaces 708 and 709, a lens 712, a charge coupled device (CCD) image sensor 711 and a cold-cathode tube lighting circuit 810 (described later) lighting the cold-cathode tube 707 as illustrated in FIG. 10. The image reading unit 604 of the second embodiment is similar to the image reading unit 104 of the first embodiment.

When an original document placed by a user on the original document setting tray 602 is read, the image reading unit 604 scans and reads the original document placed on the original document setting tray 102 from a bottom with movement thereof by the motor 813 and the belt mechanism (not shown) as similar to the first embodiment described above. When the original document feeding unit 608 is used to read the original document, the image reading unit 604 moves to a predetermined reading position of the reading window 609 so as to read the original document conveyed on the original document setting tray 602 while being in a halt state. The original document reading by the image reading unit 604 is similar to that of the first embodiment described above.

As illustrated in FIG. 10, the original document feeding unit 608 includes an original document sensor 701, a pickup roller 702, a conveyance roller 703, a read-start sensor 704, an ejection roller 706 and the reading window 609, and automatically conveys the original document to be read by the image reading unit 604.

The original document sensor 701 is disposed in a vicinity of a feeding opening in which the original document is placed, and determines whether or not the original document is placed in the feeding opening of the original document feeding unit 608. Where the original document is placed in the feeding opening, the image reading unit 604 reads the original document while being in the halt state.

The pickup roller 702 separately conveys each of the original documents placed in the feeding opening. The conveyance roller 703 is disposed in a conveyance path on which the original document is conveyed, and conveys the original document toward a direction of the reading window 609 disposed at a downstream side of the conveyance path.

The read-start sensor 704 is disposed between the conveyance roller 703 and the reading window 609 in the conveyance path and detects that the original document reaches a reading position 713, that is, the original document reaches the reading window 609. The ejection roller 706 is disposed at the downstream side of the conveyance path relative to the reading window 609 and ejects the original document passed through the reading position 713. The pickup roller 702, the conveyance roller 703 and the ejection roller 706 rotate with a rotation of a motor 814 (described later) and convey the original document along the conveyance path.

The reading window 609 is integrated with the original document pressure plate 603. The reading window 609 is disposed within the reading region in which the original document on the original document setting tray 602 is read by the image reading unit 604. The image reading unit 604 reads the original document passing through the reading window 609.

Figure 11:
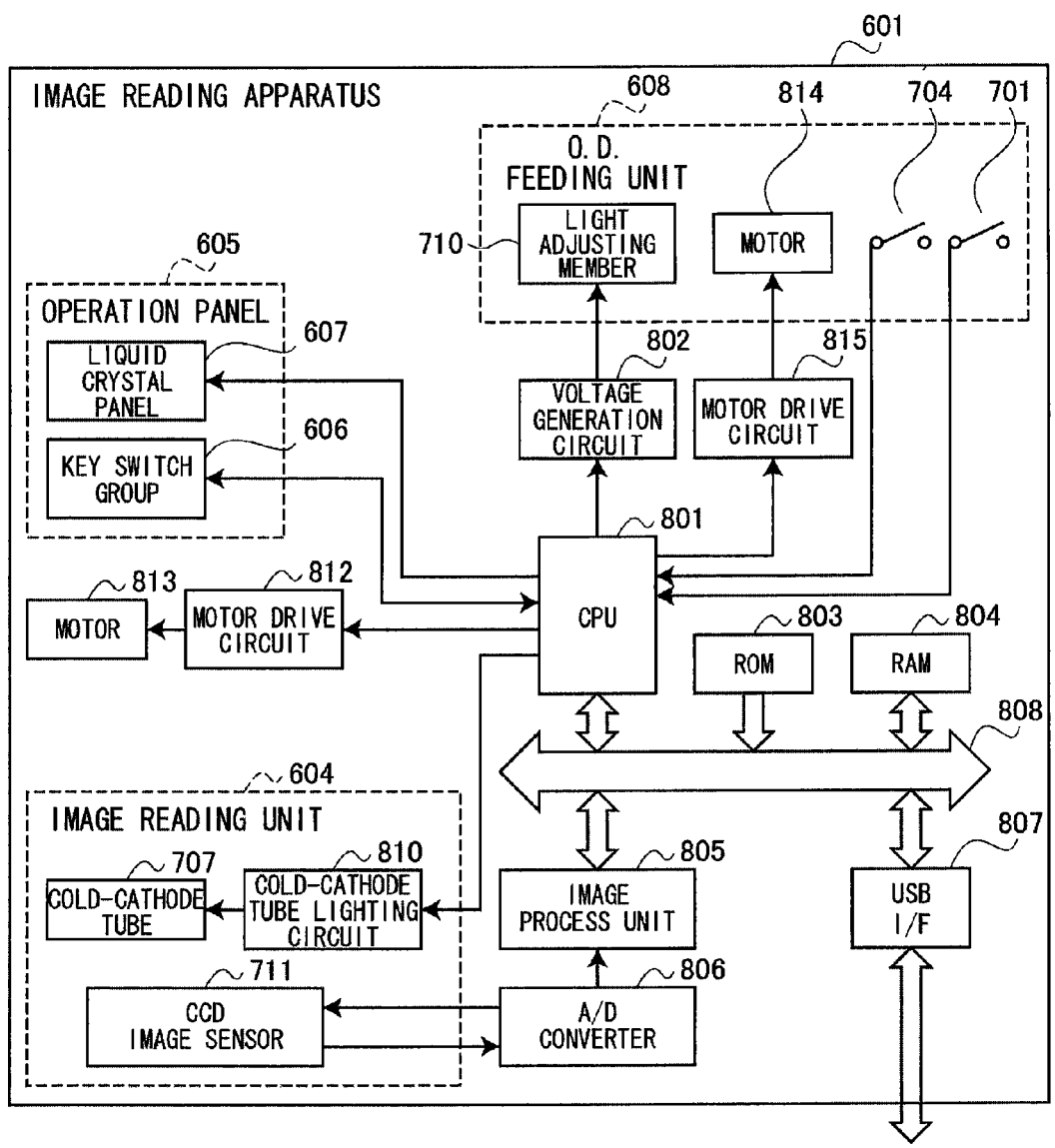
FIG. 11 is a block diagram illustrating hardware of the image reading apparatus according to the second embodiment of the present invention.

Referring to FIG. 11, hardware of the image reading apparatus 601 according to the second embodiment of the present invention is illustrated. The image reading apparatus 601 includes a central processing unit (CPU) 801, a voltage generation circuit 802, a read only memory (ROM) 803, a random access memory 804, an image process unit 805, an analog digital converter 806, a universal serial bus interface (USBI/F) 807, a data control bus 808, a cold-cathode tube lighting circuit 810, motor drive circuits 812 and 815, and the motors 813 and 814 in addition to the original document feeding unit 608, the image reading unit 604 and the operation panel 605 described above.

The elements included in the image reading apparatus 601 are similar to those included in the image reading apparatus 101 of the first embodiment except for the motor drive circuit 815 and the motor 814. A description of elements similar to those included in the image reading apparatus 101 of the first embodiment is omitted. The motor drive circuit 815 drives the motor 814 with the power for driving each of the rollers disposed in the original document feeding unit 608. The motor drive circuit 815 is a circuit that drives the motor 814. When the image reading unit 604 reads the original document, the motor drive circuit 815 drives the motor 814 based on the control of the CPU 801 such that the original document feeding unit 608 moves the original document to pass through the reading window 609. Consequently, the original document as a whole is photoelectrically converted, and image data is obtained.

Now, a light adjusting member 710 including the reading window 609 is described. The light adjusting member 710 is disposed between the original document setting tray 602 serving as the first guide member and the original document feeding unit 608 serving as the second guide member, and includes a liquid crystal member sealed between a pair of resin substrates having transparent electrodes as similar to the first embodiment. A detail description of the light adjusting member 710 is omitted; however, a glass member is employed according to the second embodiment.

Such a light adjusting member 710 is, as similar to the first embodiment, applied with the voltage controlled by the CPU 801 through the voltage generation circuit 802, and the CPU 801 serves as a light adjusting control unit. Where the voltage is not applied from the voltage generation circuit 802, the light adjusting member 710 becomes in a light diffusion state. In such a state, when the light is irradiated from the image reading unit 604 side, the irradiated light is scattered and reflected due to being in the light diffusion state of the light adjusting member 710. Therefore, the reading window becomes white that is substantially the same color as the original document pressure plate 603.

On the other hand, where the voltage is applied from the voltage generation circuit 802, the light adjusting member 710 becomes in a light-transmissive state. In such a state, when the light is irradiated from the image reading unit 604 side, the irradiated light permeates through the light adjusting member 710 due to being in the light-transmissive state of the light adjusting member 710. In other words, the irradiated light permeates through the reading window 609. The permeated light irradiates the original document conveyed on the reading window 609, and the light reflected by the original document is collected, so that the CCD image sensor 711 reads the original document.

The original document sensor 701 of the original document feeding unit 608 transmits a signal indicating the placement of the original document in the original document feeding unit 608 to the CPU 801. The read-start sensor 704 of the original document feeding unit 608 transmits a signal indicating that a leading end of the original document reaches the reading position 713. Upon receiving the signal, the CPU 801 executes the process of reading the original document.

Figure 12:
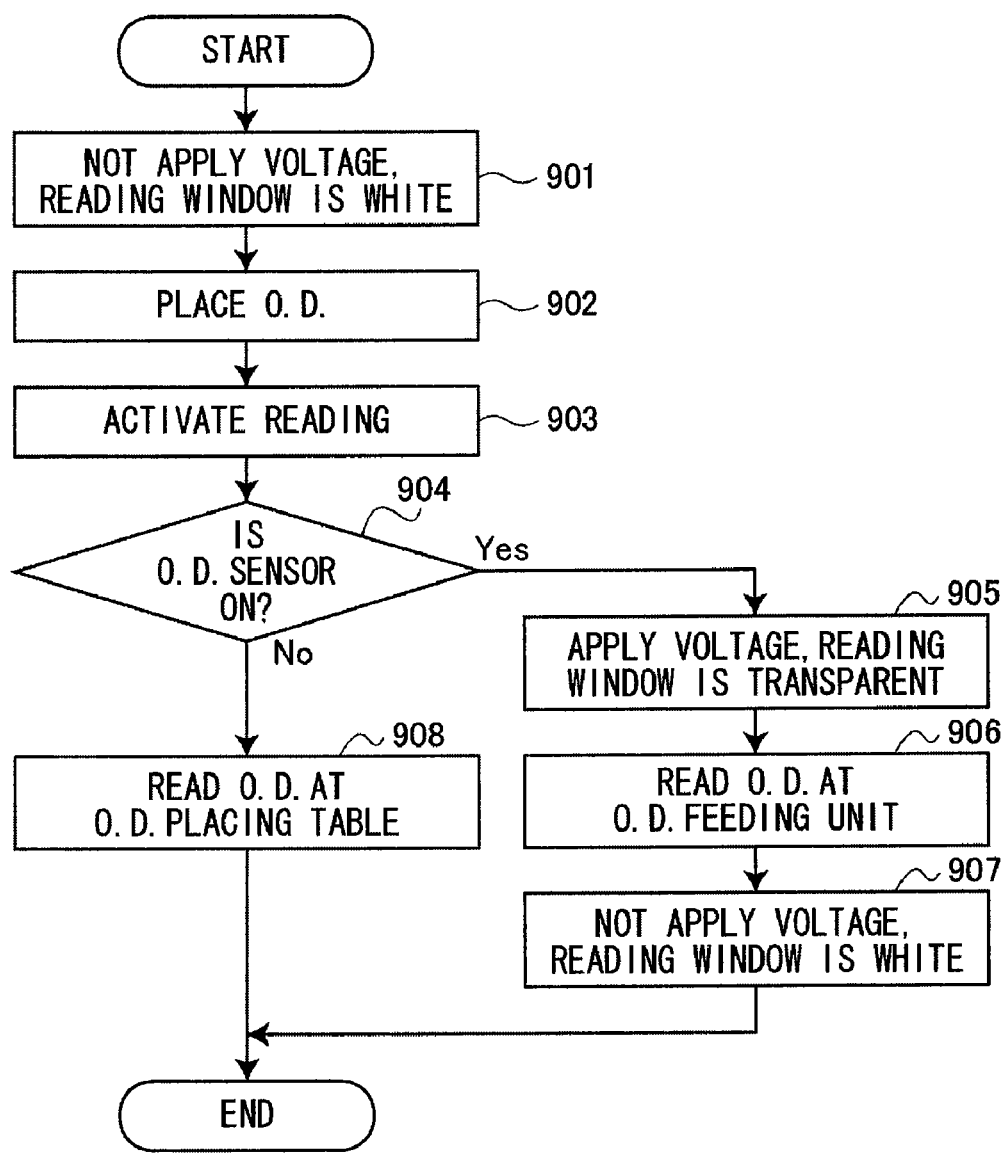
FIG. 12 is a flowchart illustrating an example procedure for a reading operation of the image reading apparatus according to the second embodiment of the present invention.

Referring to FIG. 12, a flowchart illustrates an example procedure for the reading operation in the image reading apparatus 601 according to the second embodiment. Prior to the reading operation of the original document in the image reading apparatus 601, the CPU 801 controls not to apply the voltage from the generation circuit 802 to the light adjusting member 710. Consequently, prior to the reading operation, the light adjusting member 710 becomes in the light diffusion state having the high reflection rate, and the reading window 609 becomes white as being in a scatteration state (step S901).

In such states, the user using the image reading apparatus 601 places an image of the original document to be read in the original document feeding unit 608 (step S902).

The user operates the key switch group 606 of the operation panel 605 and activates the reading operation to execute the reading of the original document placed in the original document feeding unit 608 (step S903).

Upon receiving an instruction from the operation panel 605 to activate the reading operation of the original document, the CPU 801 confirms whether or not the original document sensor 701 of the original document feeding unit 608 is ON (step S904).

Where the original document sensor 701 is ON (Yes in step S904), the CPU 801 controls to begin the reading operation of the original document placed in the original document feeding unit 608. In the reading operation, the CPU 801 controls the image reading unit 604 to move in such a manner to be across from the reading position 713 of the original document feeding unit 608 with the original document setting tray 602 therebetween. Here, the CPU 801 controls to drive the motor 813 to rotate through the motor drive circuit 812 so as to move the image reading unit 604.

Next, the CPU 801 controls the cold-cathode tube 707 to light through the cold-cathode tube lighting circuit 810. Simultaneously, the CPU 810 controls the application of the voltage to the light adjusting member 710 through the voltage generation circuit 802 (step S905). Consequently, the light adjusting member 710 becomes in the light-transmissive state permeating the light therethrough, and the reading window 609 becomes in a light permeation state permeating the light therethrough. Here, the image process unit 805 activates the CCD image sensor 711 and the A/D converter 806. Therefore, the light generated from the cold-cathode tube 707 of the image reading unit 604 permeates through the reading window 609, so that the original document conveyed by the original document feeding unit 608 is read.

The CPU 801 executes the reading operation of the original document placed in the original document feeding unit 608 (step S906). In such a reading operation, the CPU 801 controls the motor 810 of the original document feeding unit 608 to rotate through the motor drive circuit 815. The pickup roller 702, the conveyance roller 703 and the ejection roller 706 of the original document feeding unit 608 begin to rotate with rotation of the motor 814. The pickup roller 702 separately conveys each of the original documents placed in the original document feeding unit 608 into the conveyance path. The conveyance roller 703 conveys the original document conveyed by the pickup roller 702 to the read-start sensor 704, and the read-start sensor 704 becomes ON.

When the read-start sensor 704 is detected to be ON, the CPU 801 measures a predetermined time period elapsing for the leading end of the original document to be conveyed in the conveyance path to reach the reading position 713 having the reading window 906. When the leading end of the original document reaches the reading position 713, the CPU 801 controls the image process unit 805 to begin the process.

The light generated from the cold-cathode tube 707 irradiates the reading window 609, permeates through the light adjusting member 710, and is reflected by a surface of an original document being conveyed. After the reflection light from the surface of the original document is reflected by the mirror surfaces 708 and 709 within the image reading unit 604, the light is collected by the lens 712. The collected light is photoelectrically converted by the CCD image sensor 711.

The CCD image sensor 711 generates the voltage using the light amount received by the photoelectrical conversion. The A/D converter 806 receives the voltage generated by the CCD image sensor 711 and converts the received voltage into the digital value. In other words, the image of the original document read by the image reading unit 604 is converted into the digital value. The image process unit 805 executes a predetermined image process such as a bit correction of the image data converted into the digital value.

In the course of reading operation of the original document, the original document sequentially passes the reading position 713 from the leading end to a tailing end thereof by the original document feeding unit 608 and is sequentially scanned from the leading end to the tailing end thereof by the CCD image sensor 711, so that the image on the surface of the original document as a whole is read. When the tailing end of the original document passes the read-start sensor 704, the read-start sensor 704 becomes OFF.

When the read-start sensor 704 is detected to be OFF, the CPU 801 measures a predetermined time period elapsing for the tailing end of the original document to reach the reading position 713 having the reading window 906. When the tailing end of the original document reaches the reading position 713, the CPU 801 controls the image process unit 805 to halt the process. Then, the CPU 801 controls to transmit the image data ready by the image reading unit 604 to the outside through the USBI/F 807.

Here, the CPU 801 confirms a state of the original document sensor 701 and confirms whether or not the original document is placed in the original document feeding unit 608. Where the original document is placed in the original document feeding unit 608, the CPU 801 repeats the reading operation described above until no original document remains. Where the original document is not placed in the original document feeding unit 608, the CPU 801 controls the rotation of the motor 814 to halt through the motor drive circuit 815 after the original document is ejected from the original document feeding unit 608 through the ejection roller 706. Then, the reading operation is finished.

After finishing the reading operation, the CPU 801 controls to halt the application of the voltage to the light adjusting member 710 through the voltage generation circuit 802, and controls the reading widow 609 to become white as being in the scatteration state (step S907). After the reading window 609 becomes white, the CPU finishes the process.

On the other hand, where the user places the original document in the original document setting tray 602 of the image reading apparatus 602 and activates the reading operation using the key switch group 606 of the operation panel 605, the original document sensor 701 is OFF (No in step S904). Here, the CPU 801 controls to begin the reading operation of the original document placed in the original document setting tray 602. In such a reading operation, the CPU 801 controls not to apply the voltage from the voltage generation circuit 802 to the light adjusting member 710. Therefore, the light adjusting member 710 remains in the light diffusion state with high reflection rate, and the reading window 609 remains white as being in the scatteration state.

Subsequently, the CPU 801 controls to read the original document placed in the original document setting tray 602 (step S908). In such a reading operation, the CPU 801 controls the motor 813 to rotate through the motor drive circuit 812 and controls the image reading unit 604 to move to a start position of the original document reading in such a manner to be along the original document setting tray 602.

Next, the CPU 801 controls the cold-cathode tube 707 to light through the cold-cathode tube lighting circuit 810. Here, the image process unit 805 activates the CCD image sensor 711 and the A/D converter 806.

When the cold-cathode tube 707 lights, the generated light irradiates the surface of the original document placed on the original document setting tray 602 and is reflected by the surface of the original document. After the reflection light reflected from the surface of the original document is reflected by the mirror surfaces 708 and 709 within the image reading unit 604, the light is collected by the lens 712. The collected light is photoelectrically converted by the CCE image sensor 711.

The CCD image sensor 711 generates the voltage using the light amount received by the photoelectric conversion. The A/D converter 806 receives the voltage generated by the CCD image sensor 711, and converts the received voltage into the digital value. In other words, the image of the original document read by the image reading unit 604 is converted into the digital value. The image process unit 805 executes a predetermined image process such as a bit correction of the image data converted into the digital value.

The CPU 801 again controls the motor 813 to rotate through the motor drive circuit 812, and controls the image reading unit 604 to move to a position in which the image of the original document is not yet read in such a manner to be along the original document setting tray 602. After the image reading unit 604 moves, as similar to the above, the image of the original document is read and is converted into the digital value, so that the image data converted into the digital value is transmitted to the image process unit 805. Therefore, the CPU 801 controls the image reading unit 604 to move to a position in accordance with a length of the original document. In other words, the original document placed on the original document setting tray 602 is sequentially scanned from the leading end to the tailing end thereof by the CCD image sensor 711, so that the image of the surface of the original document as a whole facing to the image reading unit 604 is read. The CPU 801 controls to transmit the image data read by the image reading unit 604 to the outside though the USBI/F 807. Therefore, when the original document reading is finished, the CPU 801 finishes the process.

In the course of reading operation as described above, the reading window 906 is white as being in the scatteration state. For example, in a prior art reading apparatus having a prior art reading window, a glass material or a sheet material, etc. having high transparency (i.e., high light-transmittancy) is employed for the prior art reading window. Such a prior art reading window is disposed on an original document tray and presses an original document placed on the original document setting tray with integration with a white original document pressure plate being in a scatteration state.

In such a prior art image reading apparatus, when the original document on the original document setting tray is read, the light reflected from the original document pressure plate side irradiates the original document in a region being pressed by the original document pressure plate; however, the light permeates through the original document in a region being pressed by the prior art reading window without reflection of the light by a reading unit. Since the prior art reading window of the original document feeding unit and the pressure plate have different reflection rates of the light, a reflection light amount of the original document is decreased, and darkness is locally generated within image data, causing deterioration of an image quality.

According to the embodiment of the present invention, the reading window 609 is white as being in the scatteration state in the course of reading operation of the original document placed on the original document table 602, thereby reducing (if not eliminating) the deterioration of the image caused by a phenomenon such as the locally generated darkness or an appearance of the reading window as an image. Moreover, a phenomenon such as an appearance of the reading window as an image in an original document outside region in the original document of irregular size can be reduced (if not eliminated).

Therefore, the image reading apparatus 601 according to the second embodiment of the present invention can reduce (if not eliminate) the deterioration of the image by having the rearing window 609 in white as being in the scatteration state. In other words, the permeation of the light though the light adjusting member 711 including the rearing window 609 is adjusted, thereby reducing the deterioration of the image caused by the reflection light irradiated from the backside of the original document when the original document is read. Therefore, the image reading apparatus 601 capable of producing the higher quality image can be provided. Moreover, since the reading window 609 is placed on the original document setting tray 602, the image reading apparatus 601 can have a reduced size.

The image reading apparatus 601 according to the second embodiment of the present invention switches the color of reading window 609 from the transparent to white when the image is read, but not limited thereto as long as the reflection rate of the reading window 609 is near the reflection rate of the original document pressure plate 603 by adjusting the reflection light irradiated from the backside of the original document by switching the light adjusting member 710 between the light diffusion state and the light-transmissive state. In addition, the original document pressure plate 603 of the image reading apparatus 601 described in the second embodiment may be replaced with the original document pressure plate 103 having the light adjusting member 202 described in the first embodiment, and the permeation of the light may be adjusted by the light adjusting member 202 when the original document placed on the original document setting tray 602 is read.

Therefore, the image reading apparatuses 101 and 601 according to the first and second embodiment of the present invention is not limited to a scanner and is also applicable to an apparatus such as a photocopier, a multi-functional device and facsimile having an image reading unit. According to the first and second embodiments, although the CCD image sensors 305 and 711 are employed as the image sensors, alternatively, a contact image sensor may be employed.

Figure 13:
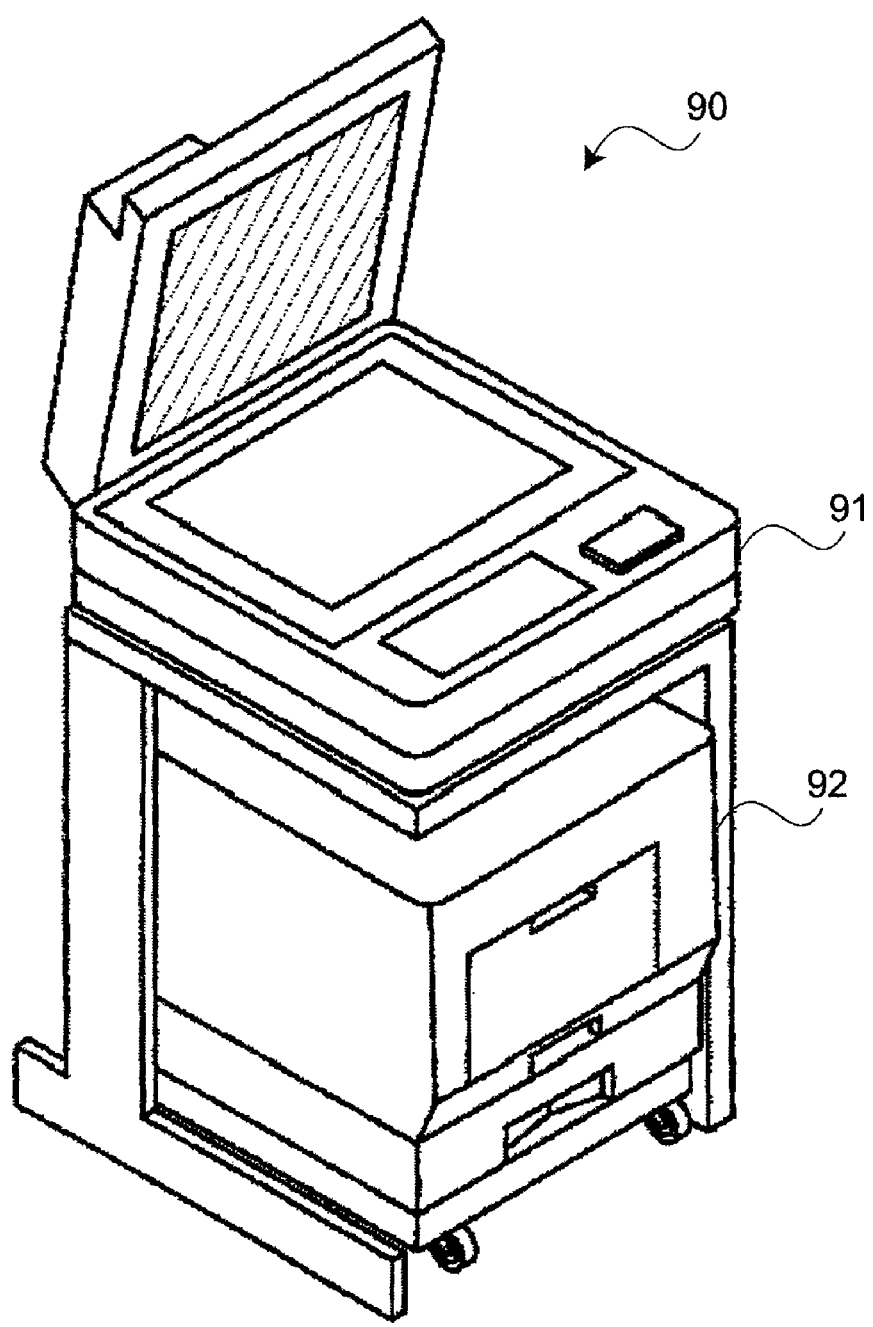
FIG. 13 is a schematic diagram illustrating a photocopier as an image forming apparatus employing an image reading apparatus according to the present invention.

Moreover, the present invention can be applied to an image forming apparatus such as a photocopier. A photocopier 90 according to the present invention is illustrated in FIG. 13. The photocopier 90 includes a reading unit 91 at an upper portion thereof and an image forming unit 92 at a lower portion thereof. A configuration of the reading unit 91 is substantially the same as the image reading apparatus 101, 601 according to the first and second embodiments described above, and the reading unit 91 generates image data reducing the show-through. The image forming unit 92 forms the image corresponding to the image data generated by the reading unit 91 on a sheet medium such as a sheet of paper. The image forming unit 92 can employ, for example, an ink jet method and an electrophotographic method. Therefore, such a photocopier 90 can reduce the show-through when an original document is copied.

As can be appreciated by those skilled in the art, numerous additional modifications and variation of the present invention are possible in light of the above-described teachings. It is therefore to be understood that, within the scope of the appended claims, the disclosure of this patent specification may be practiced otherwise than as specifically described herein.

What is claimed is:

1. An image reading apparatus comprising:
   a reading unit reading an original document;
   a first guide member having a first surface placing the original document thereon when the reading unit reads the original document and a second surface, the second surface being the back of the first surface;
   a second guide member disposed opposite to the first surface of the first guide member;
   a plurality of document detection sensors, disposed opposite to the second surface of the first guide member, detecting a size of the original document placed on the first surface;
   a light adjusting member, disposed between the first guide member and the second guide member, adjusting permeation of light irradiated from the reading unit; and
   a light adjusting control unit controlling the light adjusting member,
   wherein the light adjusting control unit controls the light adjusting member such that the light adjusting member reflects the light irradiated from the document detection sensors when the document detection sensors detect the size of the original document, the light adjusting control unit controls the light adjusting member such that the light adjusting member permeates the light irradiated from the reading unit when the reading unit reads the original document.

2. The image reading apparatus according to claim 1 further comprising a light absorption member, disposed between the light adjusting member and the second guide member, absorbing the light permeated through the light adjusting member.

3. The image reading apparatus according to claim 1, wherein the first guide member is an original setting tray placing thereon the original document to be read by the reading unit.

4. The image reading apparatus according to claim 1, the second guide member is an original document pressure plate pressing the original document to be read by the reading unit to the first guide member.

5. The image reading apparatus according to claim 1, wherein the second guide member is an original document feeding unit feeding and conveying the original document to be read by the reading unit to an area between the first guide member and the light adjusting member.

6. The image reading apparatus according to claim 1 further comprising a voltage supply unit connected to the light adjusting member and supplying voltage, wherein the light adjusting control unit controls the voltage supply unit to adjust the light permeating through the light adjusting member.

7. The image reading apparatus according to claim 1, wherein the light adjusting member adjusts the light in such a manner to permeate or scatter the light, and
   wherein the light adjusting control unit adjusts the light permeating through the light adjusting member in such a manner to switch the light to permeate or scatter when the original document is read and when the original document is not read.

8. An image forming apparatus comprising:
   the image reading apparatus according to claim 1; and
   an image forming mechanism forming an image corresponding to image data generated by the image reading apparatus.

* * * * *